(12) United States Patent
Williams et al.

(10) Patent No.: US 7,577,680 B1
(45) Date of Patent: *Aug. 18, 2009

(54) WEB-ENABLED SUBSCRIPTION MARKETING APPLICATION

(75) Inventors: Greg Williams, San Francisco, CA (US); Mace Wolf, Berkeley, CA (US); James E Tucker, Mill Valley, CA (US)

(73) Assignee: Integrated Marketing Technology, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,986

(22) Filed: Aug. 13, 2007

Related U.S. Application Data

(63) Continuation of application No. 09/709,211, filed on Nov. 9, 2000, now Pat. No. 7,257,596.

(51) Int. Cl.
  *G06F 7/00* (2006.01)
(52) U.S. Cl. .................. 707/102; 705/7; 705/12; 707/104.1; 707/204
(58) Field of Classification Search .............. 705/10; 707/102
  See application file for complete search history.

(56) References Cited

U.S. PATENT DOCUMENTS

| | | | |
|---|---|---|---|
| 5,778,182 | A | 7/1998 | Cathey et al. |
| 5,930,764 | A | 7/1999 | Melchione et al. |
| 6,026,368 | A | 2/2000 | Brown et al. |
| 6,078,924 | A | 6/2000 | Ainsbury et al. |
| 6,161,103 | A | 12/2000 | Rauer et al. |
| 6,385,604 | B1 | 5/2002 | Bakalash et al. |
| 6,480,836 | B1 | 11/2002 | Colby et al. |
| 6,516,189 | B1 | 2/2003 | Frangione et al. |
| 7,080,090 | B2 | 7/2006 | Shah et al. |

FOREIGN PATENT DOCUMENTS

JP   10177578 A   6/1998

OTHER PUBLICATIONS

Chaudhuri et al. "An over view of data warehousing and OLAP technology," ACM SUGMOD Record, 1997 (retrieved from Internet).
Bock et al. "Benefits of Denormalized Relational Database Tables," 1996 Proceedings of the Decision Sciences Institute, 1996 (retrieved from Internet).
"Chapter 20 Database Design Issues," Microsoft SQL Server DBA Survival Guide—Chapter 20, 1997 (retrieved from Internet).
Golfarelli et al. "The Dimensional Fact Model: A Conceptual Model for Data Warehouses," IJCIS, 1998 (retrieved from Internet).

*Primary Examiner*—Bradley B Bayat
*Assistant Examiner*—Jaime Cardenas-Navia
(74) *Attorney, Agent, or Firm*—Aka Chan LLP

(57) ABSTRACT

The present invention provides network based reporting techniques designed to meet the needs of subscription based marketers. Clients access, edit report on, and analyze their subscriber database using the Internet, for example. In a representative embodiment, a plurality of client computers connect to the Internet using a local area network (LAN), for example. The client computers pass security protocols before gaining access to web, application, and database servers. Once connected, the client computers are able to retrieve and display information using a web browser. Database contents are denormalized to provide the capability to generate reports based upon relatively large amounts of information. In addition, the data is transformed into a structure specifically to facilitate and enhance multi-channel subscription marketing activities.

20 Claims, 12 Drawing Sheets

WEB-ENABLED SUBSCRIPTION MARKETING APPLICATION

CROSS-REFERENCE TO RELATED APPLICATION

This patent application is a continuation of U.S. patent application Ser. No. 09/709,211, filed Nov. 9, 2000 (now U.S. Pat. No. 7,257,596, issued Aug. 14, 2007), which is incorporated by reference.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights.

BACKGROUND OF THE INVENTION

The present invention relates generally to network based marketing techniques, and specifically to techniques for managing and analyzing subscriber information in a networked computer environment.

Few could foresee the rapid expansion of direct marketing campaigns just a 25 few years ago. Direct marketers use a variety of marketing techniques to provide information about new products and services to consumers. Direct mail, internet advertising, television, radio, newspaper, and magazine advertising provide channels of communication for product information to consumers. Surveys, purchasing information, transaction information and others provide information about consumer behavior to the direct marketer. Computers and televisions that now have a place in our homes and offices enable product manufacturers, wholesalers and retailers to "take their case directly to the public," by providing a communications medium with direct access to the consumer. Never before have consumers been offered such a wide variety of choices in the products for their homes, work and recreation.

As computer automation continues to provide an ever increasing access to consumers, marketers have discovered that conventional marketing information methods do not readily scale to the exponential proliferation of information accompanying direct marketing campaigns. For example, results from multiple targeted marketing campaigns must be sorted, assimilated, analyzed and managed on a continuing basis.

Conventional techniques for information management exhibit inefficiencies when applied to the subscription marketing campaign field. For example, conventional techniques are frequently embodied in specialized software, or require custom solutions. Many conventional approaches require the user to learn and use ad hoc queries.

What is really needed are subscription information management techniques designed to meet the needs of subscription marketers.

BRIEF SUMMARY OF THE INVENTION

The present invention provides network based reporting techniques designed to meet the needs of subscription based marketers. Clients access, edit and report on their subscriber database using the Internet, for example. In a representative embodiment, a plurality of client computers connect to the Internet using a local area network (LAN), for example. The client computers pass security protocols before gaining access to web, application and database servers. Once connected, the client computers are able to retrieve and display information using a web browser. Database contents are denormalized to provide the capability to generate reports based upon relatively large amounts of information.

In a representative embodiment, the present invention provides a method for 25 analyzing subscription information. The method comprises receiving a plurality of subscription information and archiving the plurality of subscription information into a repository. Retrieving from the repository a plurality of selected subscription information and transforming the plurality of selected subscription information into transition table format information are also part of the method. Further, the method includes populating a facts database with the transition format information to produce one or more facts tables with a summarization of the transition format information. Denormalizing the summarization of the transition format information to produce a plurality of denormalized information is also part of the method. The method also includes providing a report based upon the denormalized information.

In a specific embodiment, the denormalization comprises populating selected information from one or more facts tables to a key table. The facts tables are stored in a facts table database, for example. The key table is stored in a grouping tables database. The plurality of facts tables are one of a source category table, a source table, a campaign table, and a panels table.

In a specific embodiment, the method further comprises receiving input of criteria for one or more reports and providing the report based upon the denormalized information according to the criteria. In another specific embodiment, the method further comprises receiving input of criteria for one or more tables and configuring the one or more tables based upon the criteria.

In another specific embodiment, the method further comprises receiving input of a username and a password and verifying whether the input of the username and a password corresponds to a user authorized to access reporting procedures. If the user is determined to be authorized, access to reporting procedures is provided to the user. In a specific embodiment, the method further comprises verifying whether the input of the username and a password corresponds to a user authorized to access administrative procedures. If the user is determined to be authorized access to administrative procedures is provided to the user.

Alternative embodiments include an apparatus having a plurality of means for performing the above described method.

In another representative embodiment, the present invention provides a computer program product for analyzing subscription information. The computer program product comprises a variety of software program code. For example, code that receives a plurality of subscription information and code that archives the plurality of subscription information into a repository are included in the program product. Code that retrieves from the repository a plurality of selected subscription information and code that transforms the plurality of selected subscription information into transition table format information are also part of the program product. The program product also includes code that populates a facts database with the transition format information to produce one or more facts tables with a summarization of the transition format information and code that denormalizes the summarization of the transition format information to produce a plurality of denormalized information, the denormalization comprising populating selected information from the facts tables, stored in a facts table database, to a key table, stored in a grouping tables database. Further, code that provides a report based upon the denormalized information is also included in the program product. A computer readable storage medium for holding the codes also comprises the program product.

In a yet further representative embodiment, the present invention provides a system for analyzing subscription information. The system comprises a variety of components. For example, one or more clients are connected to a web server by a computer network. An application server and a database server are connected to the web server by a communication medium, such as a computer network, for example. The clients receive subscription information and forward the subscription information via the web server and the application server to the database server, which archives subscription information into a repository. The application server retrieves selected subscription information from the repository and transforms the selected subscription information into transition table format information. The database server populates a facts database with the transition format information in order to produce one or more facts tables with a summarization of the transition format information. The application server denormalizes the summarization of the transition format information in order to produce denormalized information. This denormalization comprises populating selected information from one or more facts tables, which can be stored in a facts table database, into a key table, which is stored in a grouping tables database, for example. The application server provides a report based upon the denormalized information.

Numerous benefits are achieved by way of the present invention over conventional techniques. The present invention can provide network based reporting techniques designed to meet the needs of subscription marketers. Embodiments according to the present invention can provide real-time marketing information analysis techniques, which can provide information consumers within a business enterprise with up to the moment information and analysis for mission critical applications.

In specific embodiments according to the present invention, denormalization and report optimizing processing provides improved reporting capabilities by reducing at least one of a number of joins of database tables that must be made and a number of records that must be reported. These reductions enable specific embodiments to provide reports more quickly than conventional techniques. Specific embodiments deliver reports over computer networks, such as the Internet. Further, specific embodiments can produce a report from a relatively large number of transactions within a reasonable delay time.

These and other benefits are described throughout the present specification. A further understanding of the nature and advantages of the invention herein may be realized by reference to the remaining portions of the specification and the attached drawings.

DETAILED DESCRIPTION OF THE INVENTION

The present invention provides network based reporting techniques designed to meet the needs of subscription based marketers. Clients access, edit and report on their subscriber database using the Internet, for example. In a representative embodiment, a plurality of client computers connect to the Internet using a local area network (LAN), for example. The client computers pass security protocols before gaining access to web, application and database servers. Once connected, the client computers are able to retrieve and display information using a web browser. Database contents are denormalized to provide the capability to generate reports based upon relatively large amounts of information.

Figure 1:
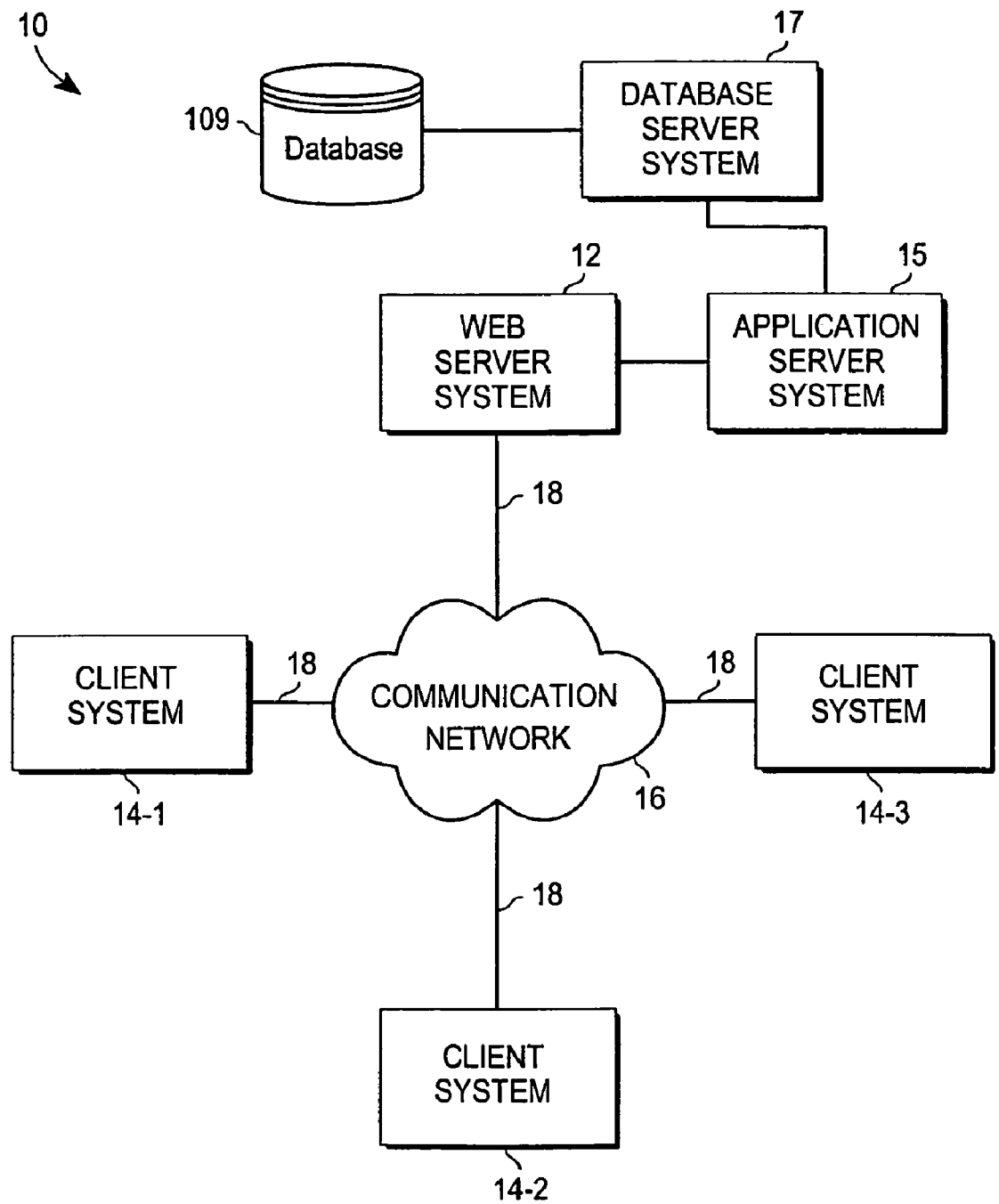
FIG. 1 depicts a simplified block diagram of a distributed computer network which may incorporate an embodiment of the present invention.

Techniques are discussed for managing the process of information gathering, analysis and storage. FIG. 1 is a simplified block diagram of a distributed computer network which may incorporate an embodiment of the present invention. Computer network 10 includes a number of computer systems 12, 15, 17, 14-1, 14-2, and 14-3. Computer systems 12, 14-1, 14-2, and 14-3 are coupled to a communication network 16 via a plurality of communication links 18. The computer systems include a plurality of client computer systems 14-1, 14-2, and 14-3, and a plurality of server computer systems 12, 15, and 17. However, in particular embodiments, two or more of server systems 12, 15, and 17 may coreside on a single computer. Client systems 14-1, 14-2, or 14-3 typically request information from a server computer system, which performs processing in response to the client request and provides the requested information to the client systems. For this reason, servers typically have more computing and storage capacity than client systems. However, a particular computer system may act as both as a client or a server depending on whether the computer system is requesting or providing information.

Communication network 16 provides a mechanism for allowing the various components of distributed network 10 to communicate and exchange information with each other. Communication network 16 may itself be comprised of many interconnected computer systems and communication links. Communication links 18 may be hardwire links, optical links, satellite or other wireless communications links, wave propagation links, or any other mechanisms for communication of information. While in one embodiment, communication network 16 is the Internet, in other embodiments, communication network 16 may be any suitable computer network. An optional firewall (not shown) having a port for connecting thereto may be provided between the server computer 12 and communications network 16. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives. For example, more than one server system 12 may be coupled to communication network 16.

Computer server systems 12, 15, and 17 may be configured to perform a plurality of functions according to the teachings of the present invention. These functions are typically performed by software code modules executing on the computer server systems 12, 15, and 17. The functions may also be performed by hardware modules coupled to server systems 12, 15, and 17, or by a combination of software and hardware modules. Functions performed by computer server systems 12, 15, and 17 include storing and retrieving information in database 109, and performing administrative functions, report generation functions, and other functions according to the teachings of the present invention. Details related to the various functions performed by server systems 12, 15, and 17 are described below.

Client systems 14-1, 14-2, or 14-3 are used to interact with one or more of 10 server systems 12, 15, and 17 using a program called a browser. The browser may be one of Internet Explorer™, by Microsoft™, or Navigator™ by Netscape™, or the like, but in a presently preferred embodiment, the browser comprises support for HTML 2.0 or higher, Active X and/or Java functions. For example, client systems 14-1, 14-2, or 14-3 may be used by users to access administrative functions and features on-line. Client systems 14-1, 14-2, or 14-3 may also be used by users to obtain reports using on-line statistical report capabilities of specific embodiments. Once a user has provided a unique user identification and password, the user may use client system 14-1, 14-2, or 14-3 to participate in administrative and report generating capabilities of server systems 12, 15, and 17. Details related to the various functions performed by client systems 14-1, 14-2, or 14-3 are described below.

According to the teachings of the present invention, computer system 12 is a web server system responsible for providing web pages to users at clients 14-1, 14-2, and 14-3, and storing information received from the clients in a format which allows later query or retrieval of the information. In a presently preferred embodiment, web server system 12, comprises Microsoft™ Internet Information Services (IIS) and Seagate™ Crystal Reports.

The term "server system" as used in this application may refer to a single server system as depicted in FIG. 1, or may refer to one or more server systems distributed within computer network 10. If the functions are distributed across a plurality of computers, each comprises a copy of Microsoft™ Internet Information Services (IIS). Accordingly, functions or tasks performed by the present invention may be distributed to one or more servers coupled to communication network 16. According to a specific embodiment, the servers may be isolated behind firewalls for security purposes and communication between the servers may be encoded and encrypted.

According to the teachings of the present invention, computer server system 15 is an application server system responsible for providing administrative and reporting capabilities. Application server system 15 comprises one or more administrative processes and one or more reporting processes. Administrative processes provide users with capabilities to create and edit database tables that contain marketing information and the like, provide security and access control functions, track usage, and the like. Reporting processes provide users with the capabilities to generate, and customize reports that provide insight into marketing information and the like. The administrative processes and reporting processes may be implemented in a variety of different ways, but in a presently preferred embodiment are implemented using Microsoft™ Visual Basic (VB) and PERL script programs (scripts).

According to the teachings of the present invention, computer system 17 is a 10 database server system responsible for providing database support. In a specific embodiment, the transaction information may be stored in a database 109 coupled to database server system 17. The term "database 109" as used in this application may refer to a single information store or to a plurality of information stores distributed within computer network For example, database 109 be locally coupled to database server system 17 or may be distributed across computer network 10 and accessed by database server system 17 via communication network 16. The database 109 may be a relational database, an object-relational database, an object-oriented database, a knowledge base, a text file, or any other way to store information. However, in a presently preferred embodiment, the database server system 17 comprises Oracle™ database and compatible hardware. In a specific embodiment of the present invention, database 109 is a relational database configured to store information according to a database schema. The information stored in database 109 may also be used to keep track of the various steps of the information analysis and storage process. For example, the status or progress of any particular step of the information acquisition process can be ascertained from the information stored in database 109. It should be apparent that although FIG. 1 depicts database 109 as a single entity, in a specific embodiment of the present invention, database 109 may comprise a plurality of databases.

Figure 2:
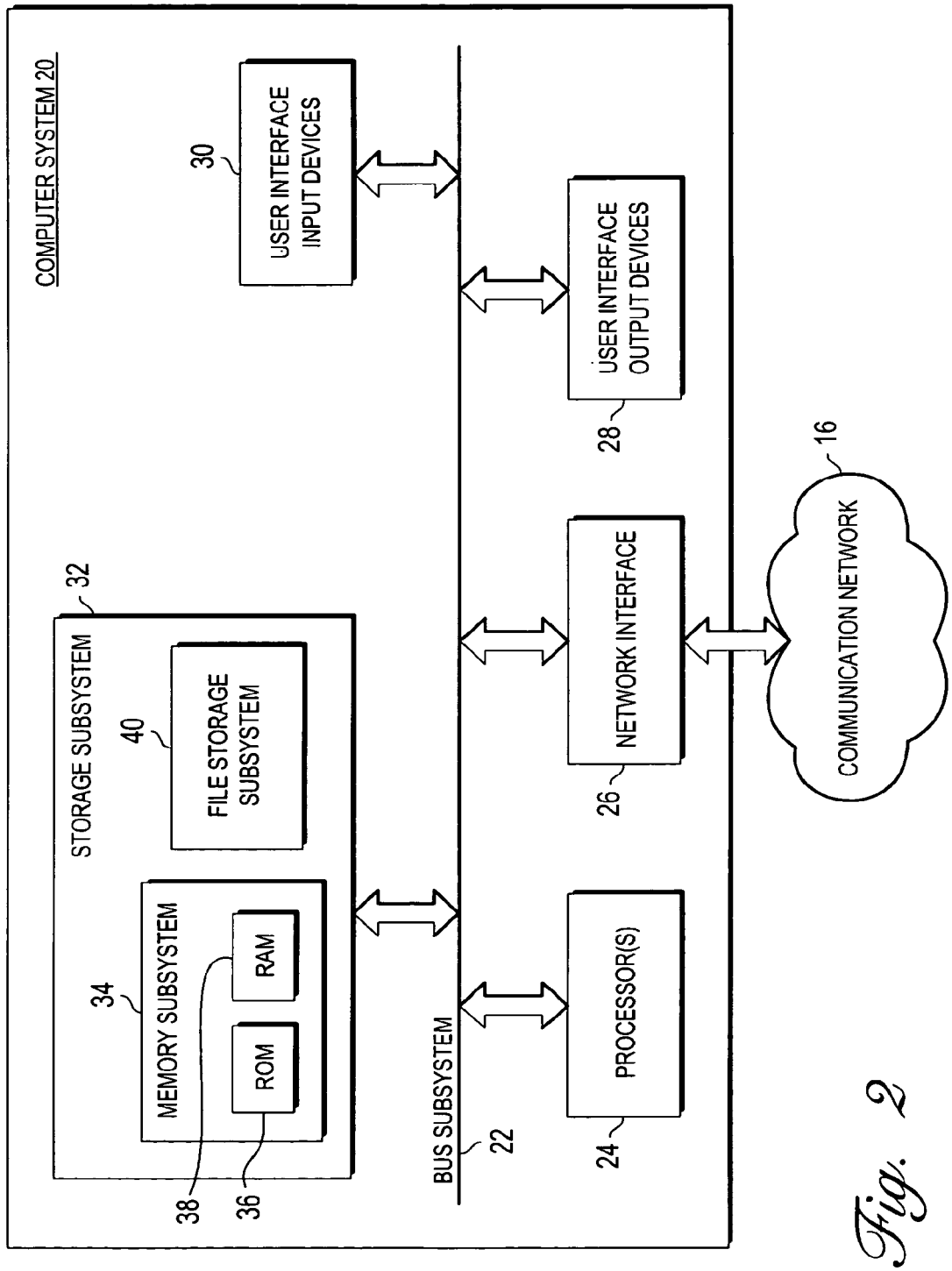
FIG. 2 depicts a simplified block diagram of a computer system which may incorporate an embodiment of the present invention.

FIG. 2 is a simplified block diagram of an exemplary computer system 20 capable of embodying one or more of client computer systems 14-1, 14-2, and 14-3, and server computer systems 12, 15, and 17 according to the present invention. Computer system 20 typically includes at least one processor 24, which communicates with a number of peripheral devices via bus subsystem 22. These peripheral devices typically include a storage subsystem 32, comprising a memory subsystem 34 and a file storage subsystem 40, user interface input devices 30, user interface output devices 28, and a network interface subsystem 26. The input and output devices allow user interaction with computer system 20.

It should be apparent that the user may be a human user, a device, another computer, and the like. Network interface subsystem 26 provides an interface to outside networks, including an interface to communication network 16, and is coupled via communication network 16 to corresponding interface devices in other computer systems.

User interface input devices 30 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 20 or onto computer network 16.

User interface output devices 28 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 20 to a human or to another machine or computer system.

Storage subsystem 32 stores the basic programming and data constructs that provide the functionality of the various systems embodying the present invention. For example, the various modules implementing the functionality of the present invention may be stored in storage subsystem 32. These software modules are generally executed by processor or processors 24. In a distributed environment, the software modules may be stored on a plurality of computer systems and executed by processors of the plurality of computer systems. Storage subsystem 32 also provides a repository for storing the various databases storing information according to the present invention. Storage subsystem 32 typically comprises memory subsystem 34 and file storage subsystem 40.

Memory subsystem 34 typically includes a number of memories including a main random access memory (RAM) 38 for storage of instructions and data during program execution and a read only memory (ROM) 36 in which fixed instructions are stored. File storage subsystem 40 provides persistent (nonvolatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 16. Information stored according to the teachings of the present invention may also be stored by file storage subsystem 40.

Bus subsystem 22 provides a mechanism for letting the various components and subsystems of computer system 20 communicate with each other as intended. The various subsystems and components of computer system 20 need not be at the same physical location but may be distributed at various locations within distributed network 10. Although bus subsystem 22 is shown schematically as a single bus, alternate embodiments of the bus subsystem may utilize multiple busses.

Computer system 20 itself can be of varying types including a personal 10 computer, a portable computer, a workstation, a computer terminal, a network computer, a television, a mainframe, or any other data processing system. Due to the ever-changing nature of computers and networks, the description of computer system 20 depicted in FIG. 2 is intended only as a specific example for purposes of illustrating the preferred embodiment of the present invention. Many other configurations of a computer system are possible having more or less components than the computer system depicted in FIG. 2. Client computer systems 14 and one or more of server computer systems 12, 15, and 17 generally have the same configuration as shown in FIG. 2, with the server systems generally having more storage capacity and computing power than the client systems.

Figure 3:
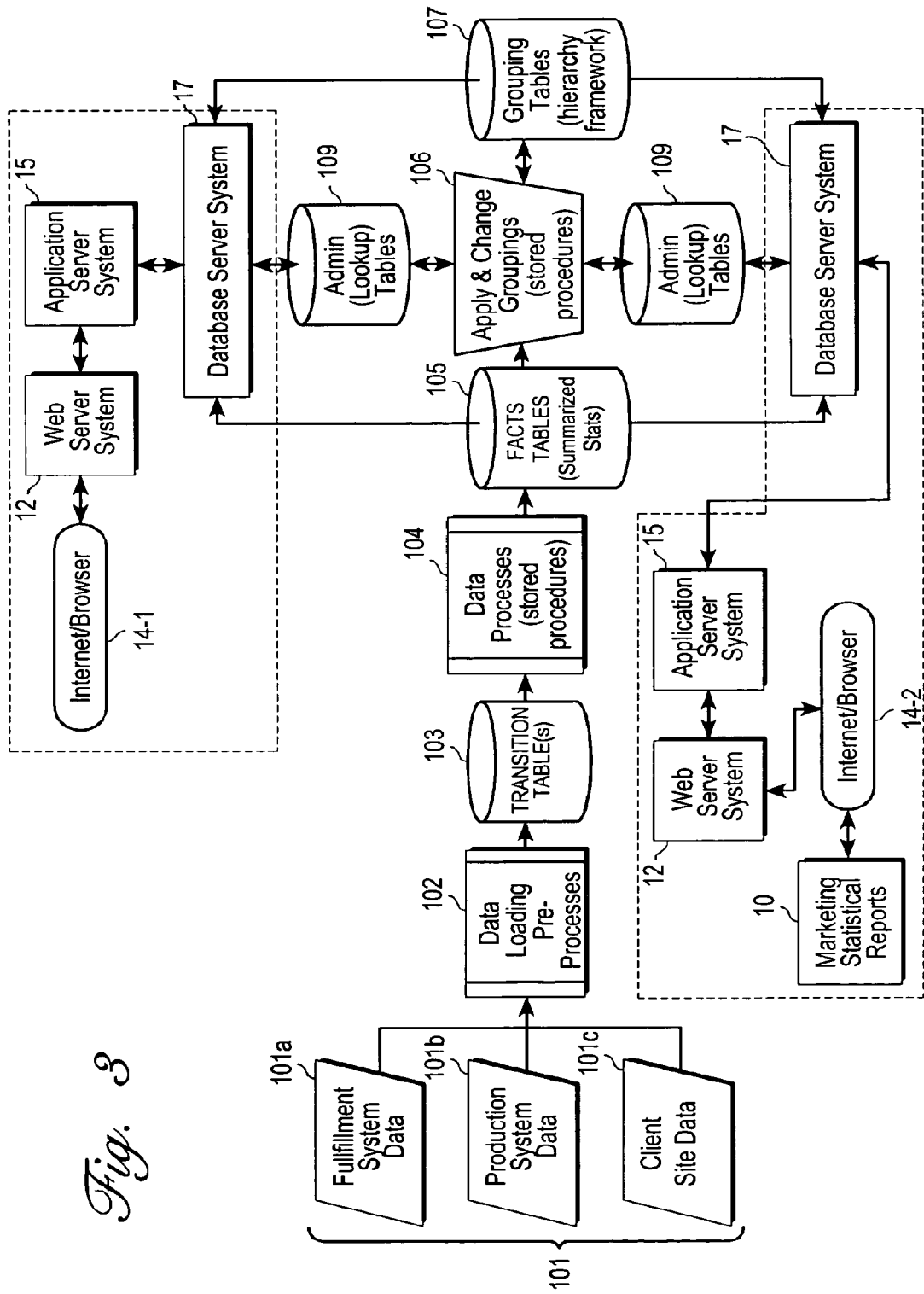
FIG. 3 illustrates a diagram of representative processing, manipulating, storing and loading of data in a specific embodiment according to the present invention.

FIG. 3 illustrates a diagram of representative processing, manipulating, storing 20 and loading of data in a specific embodiment according to the present invention. FIG. 3 illustrates a plurality of input data 101, comprising fulfillment data 101a, production data 101b, and client data 101c. Fulfillment data 101a is produced by a business process used to process an order or transaction resulting from a subscription campaign, for example. The fulfillment data 101a can be created by an "in-house" system operated by a subscription-based business or an outside service provider. Fulfillment data includes transaction and summary level statistical and coded information related to subscription orders. Fulfillment data 101a may be in a variety of formats in specific embodiments, but is preferably alphanumeric. Examples of data feed elements include source key identifiers, subscription order quantities, dollar values, demographics, and the like.

Production data 101b is produced by a business process (complimentary to fulfillment) having a function to physically manage an order shipment process and capture information related to shipment transactions. This type of process may be managed by a subscription-based business, or an outside service provider. Production data 101b may be in a variety of formats in specific embodiments, but is preferably alphanumeric. Examples of production data include product shipped, shipment date, location, subscription term, and the like.

Client data 101c comprises data related to a subscription transaction or data that is supplied by a customer. Client data 101c is supplied either directly from a subscription-based business or via a service provider. Examples include demographics, web-hit information, address information, list information, and the like.

FIG. 3 illustrates a data loading process 102 comprising of the archiving of low-level input files and the processing of these files. Data loading process 102 processes input files 101 to produce one or more transition tables 103. In a specific embodiment, the data loading application is implemented using the PERL programming language, data transformation service (DTS), and structured query language (SQL) loader script programs. During data loading process 102, input data 101 in import files is identified, validated and formatted. The transition tables 103 store input data 101 passed from the SQL loader program used in data loading process 102. A plurality of stored procedures 104 are invoked by the data loading process 102, in order to run summary procedures against the transition tables 103. These summary procedures update, replace or append summary tables 105 used for administrative or reporting purposes. Summarized data tables are referred to as "fact" tables.

The fact tables 105 store information summarized from transition tables 103. Fact tables 105 store statistical information that is used for administrative and reporting purposes, and the like. A plurality of administrative procedures 106 apply business logic to client data in order to create meaningful management information. Administrative procedures 106 are used to make changes to groupings tables 107. Administrative procedures 106 comprise analytic processes that add, edit or delete records in groupings tables 107, and are executed against the fact tables 105 and administrative lookup tables 109, using categories predefined in the groupings tables 107. In a specific embodiment, these categories correspond to an administrative hierarchy.

Lookup tables 109 can be any of a predefined look up table, and a look up table defined by a client. Predefined lookup tables include, for example: a corporation, a division, a group, a product, and a source category. Client defined look up tables include: a campaign type, a campaign status, a panel type, a panel subtype, a package, a list category, a list name, a list segment, a source ID description. Lookup tables 109 are used to translate codes or values in fact tables 105, or to apply group categories in grouping tables 107.

Groupings tables 107 store information about subscription marketing campaigns and the like. Groupings tables 107 contain one or more field categories that reflect an administrative hierarchy of the client's business process. The groupings tables 107 provide a means of categorizing data related to subscription marketing campaigns and relating these groupings to statistical facts tables 105. Facts tables 105, groupings tables 107, and administrative lookup tables 109 are stored in the database server system 17. In specific embodiments, facts tables 105, groupings tables 107, and administrative lookup tables 109 comprise a single database, or may be stored separately in a plurality of databases.

Clients may use on-line administrative functions that interact with facts tables 10 105, administrative groupings tables 107, and administrative lookup tables 109 via a web browser operative on client system 14-1, which is coupled to web server system 12. Web server 12 comprises a computer and computer software that, together with the web browser operative on client 14-1, enable users to view HTML documents, and the like. Web server 12 is coupled to application server 15. Web server 12 and application server 15 can be provided by an application service provider (ASP) web-site, for example. In specific embodiments, clients may use on-line reporting functions that interact with facts tables 105, administrative groupings tables 107, and administrative lookup tables 109 via a web browser operative on client system 14-2, which is coupled to web server 12. Web server 12 is coupled to application server 15. Web server 12 and application server 15 can be provided by an application service provider (ASP) web-site, for example. In specific embodiments, the server systems 12, 15, and 17 that implement report functions and the server systems 12, 15, and 17 that implement administrative functions may be co-resident on a single computer system, or may be distributed among a plurality of computer systems. Web server 12 interfaces with database server system 17 that comprises a database for containing the various tables, such as facts tables 105, administrative groupings tables 107, and administrative lookup tables 109, illustrated in FIG. 3.

Figure 4:
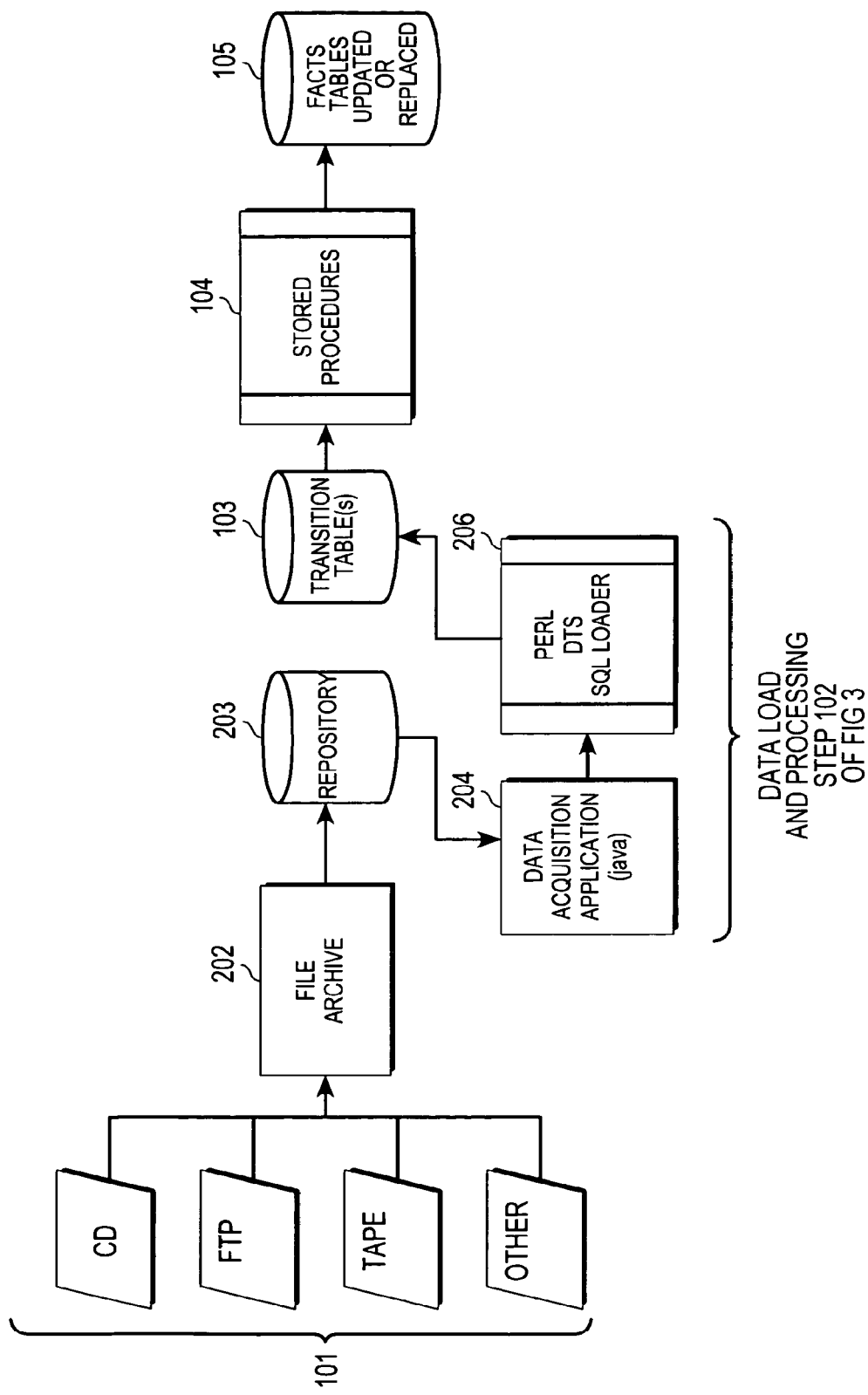
FIG. 4 illustrates a diagram of representative data acquisition, processing and loading in a specific embodiment according to the present invention.

FIG. 4 illustrates a diagram of representative data acquisition, processing and loading in a specific embodiment according to the present invention. FIG. 4 illustrates one process for taking transaction or summary level information 101 from one or more outside sources, analyzing the data, categorizing and loading the data into database tables for further analysis and administration. The input information 101 is presented in electronic form from a variety of storage mechanisms, such as a CD, a tape, or obtained using a file transfer protocol (FTP), or the like. The information 101 relates to fulfillment and processing of subscription-based transactions. The format and level of summarization of information 101 varies among specific embodiments, and may be customized to varying degrees for individual clients. Frequency input files are input that varies according to the client. Further, input information 101 can be obtained from a variety of sources, such as, for example a data processing vendor, or a client data source.

The information 101 is processed and loaded into transition tables 103 by a plurality of subprocesses of the data process 102 of FIG. 3. A file archival process 202, imports the information 101 and archives it into a storage repository 203. In a specific embodiment, the information 101 is organized in folders, which are organized by client and date. Other organization paradigms may be used in various specific embodiments. A data loader process 204 retrieves archived information from the repository 203. Based upon a type, location and owner of the information in the repository 203, the data loader executes processing of the information. The information is processed from repository 203 in this manner in serial fashion. The data loader 204 may be a software process written in any of a variety of languages, but in a presently preferable embodiment, data loader 204 is a java application that invokes scripts written in PERL. Once the information is processed from repository 203, a PERL DTS SQL loader transforms the information into a format compatible with storage into transition tables 103. This process also serves as a checkpoint restart mechanism. A checkpoint restart represents a rollback stage in the data loading process. If it is necessary to restore the database to an earlier version, this is accomplished by referring back to transition tables and then rerunning summary procedures. A rollback is triggered for a variety of reasons, including corrupted data feed files, corrupted summary procedures, and so forth. Then, as illustrated by FIG. 3, a plurality of stored procedures 104 are invoked to run summary procedures against the transition tables 103. These summary procedures update, replace or append summary tables 105 used for administrative or reporting purposes. Summarized data tables are referred to as "fact" tables. The facts tables 105 contain statistical information summarized from the transition tables 103 for administrative and reporting purposes.

Figure 5A:
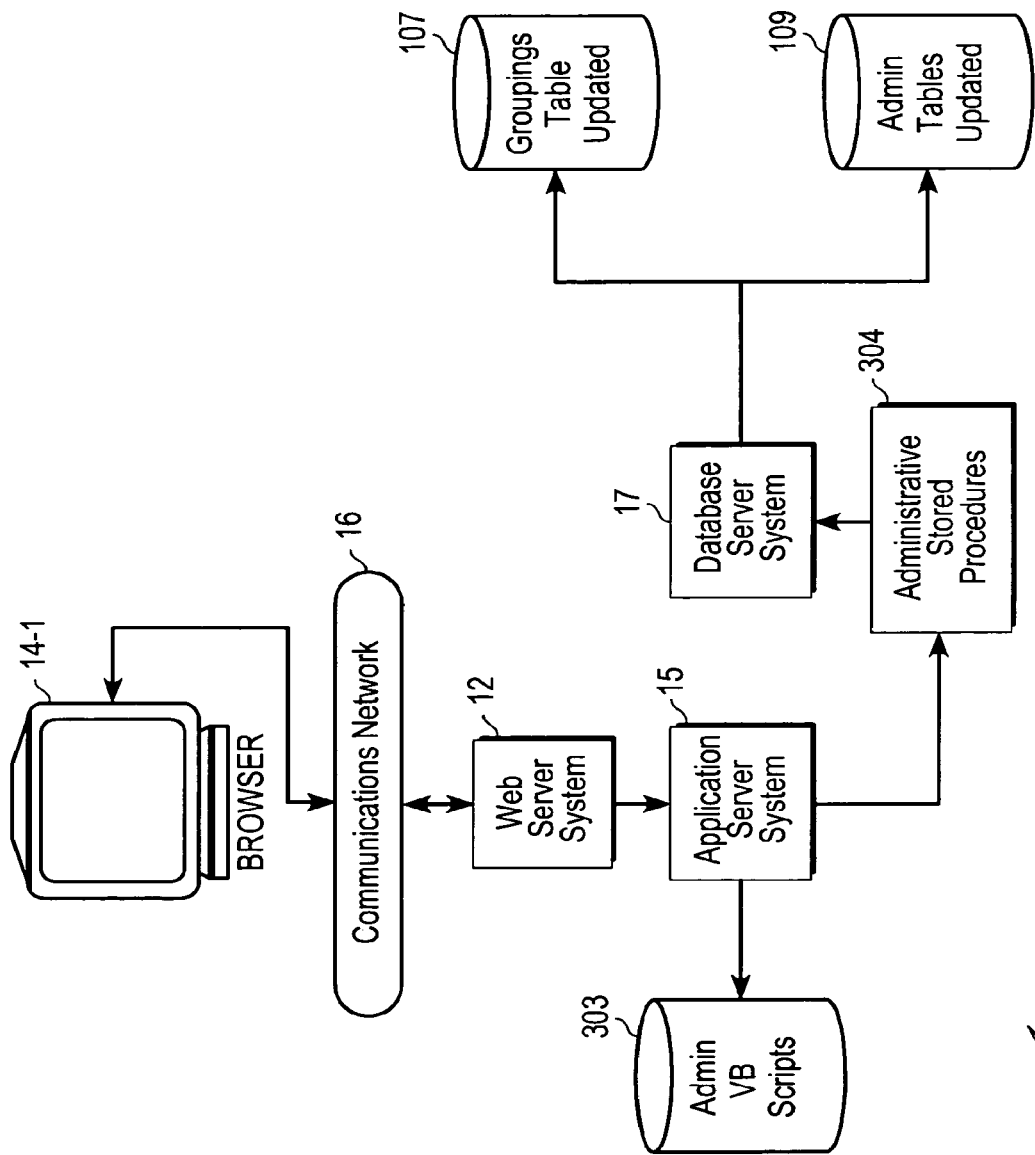
FIGS. 5A-5B illustrate diagrams of a representative on-line administrative 15 system in a specific embodiment according to the present invention.

FIG. 5A illustrates a diagram of representative on-line administrative system in a specific embodiment according to the present invention. Administrative functions enable a user to add, edit or change records in various database tables. In a specific embodiment illustrated by FIG. 5A, the administrative functions are provided using a browser-based interface which can be executed on a client computer, such as client system 14-1, for example. Client 14-1 interacts with web server 12 over network connection 16, which can be any of a number of network topologies, and may include the Internet, for example. Web server system 12 connects with application server system 15, having one or more administrative processes 303 stored thereon. Administrative processes 303 can be implemented in a variety of different ways in various specific embodiments. However, in a presently preferable embodiment, administrative processes 303 are Visual Basic (VB) scripts.

Administrative processes 303 provide a variety of functionality to specific embodiments. For example, scripts written in the Visual Basic programming language provide the basis for interactive web pages. These scripts also include triggers that activate stored procedures which effect changes to database tables. Application server system 15 interfaces with database server system 17. The application server system includes Visual Basic scripts, stored procedures, and security verification procedures. Application server system 15 has one or more administrative stored procedures 304 resident thereon. Administrative stored procedures 304 provide a central point for analytic processing that applies business logic to client data to create meaningful management information. Administrative procedures 304 are used to execute changes to groupings tables 107. These administrative procedures 304 comprise analytic processes that add, edit, or delete records in groupings tables 107, and are executed against the facts tables 105 and administrative lookup tables 109, using categories predefined in the groupings tables 107. These categories correspond to an administrative hierarchy. Clients interact with administrative procedures 304 via the application server 15 which can be connected to an application service provider's (ASP) web-site, for example.

The application server 15 activates various unique and proprietary stored procedures. The administrative procedures 304 provide the capability to update grouping categories corresponding to an administrative hierarchy in the groupings table 107 and user-defined categories in the administrative tables 109.

Figure 5B:
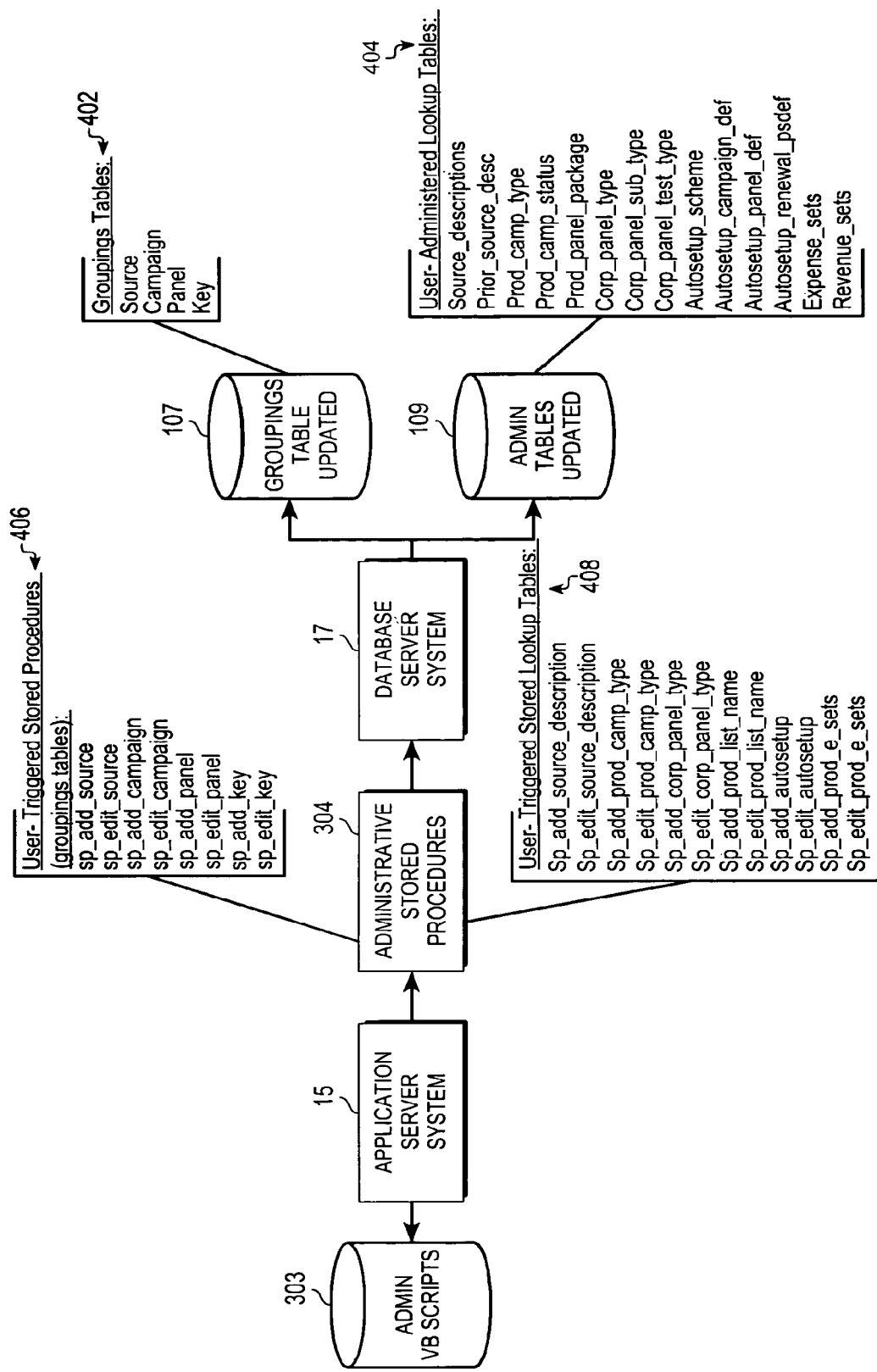

FIG. 5B illustrates a detail diagram of a representative on-line administrative 25 system of FIG. 5A in a specific embodiment according to the present invention. The administrative on-line system comprising administrative processes 303, application server system 15, administrative procedures 304, and database server system 17. Information in the groupings table 107 comprises a grouping 402 entitled "Groupings Tables:" that comprises a plurality of field categories, including a source, a campaign, a panel, and a key. It is noteworthy that some specific embodiments may not have all of the field categories shown, and/or may comprise other field categories not illustrated by FIG. 5B. Administration table 109 comprises a grouping 404 entitled "User-Administered Lookup Tables:" which comprises a plurality of field categories, as illustrated by FIG. 5B. It is noteworthy that some specific embodiments may not have all of the field categories shown, and/or may comprise other field categories not illustrated by FIG. 5B. In a specific embodiment, users can create custom grouping categories in order to analyze the data and customize reporting. Administrative procedures 304 comprises a plurality of user triggered stored procedures 406 that enable users to add or edit items into grouping tables 107. Further, administrative procedures 304 comprises a plurality of user triggered stored procedures 408 that enable users to customize administration tables 109.

Figure 6:
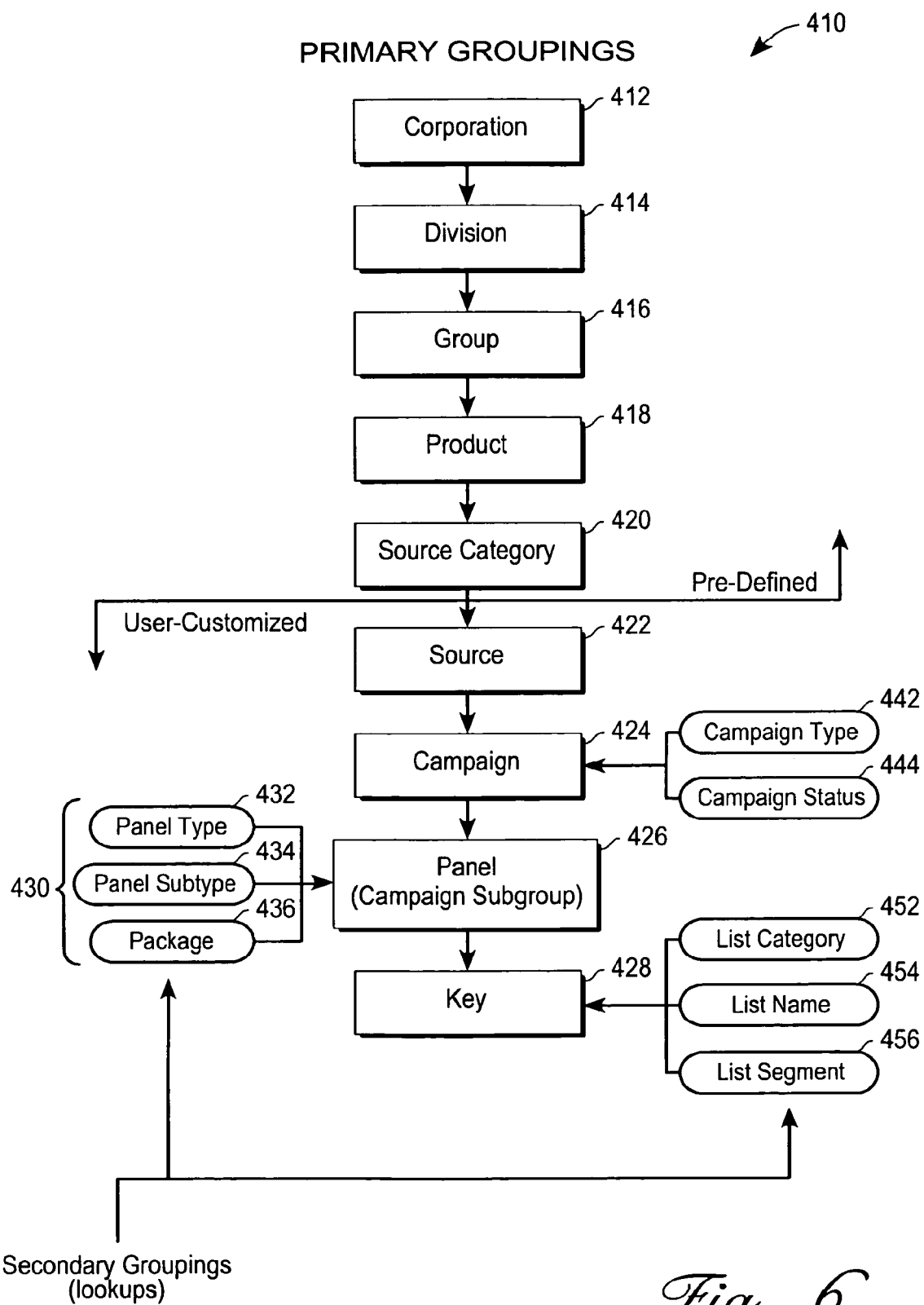
FIG. 6 illustrates a diagram of a representative administrative framework that provides a grouping hierarchy in a specific embodiment according to the present invention.

FIG. 6 illustrates an administrative framework that provides a grouping hierarchy in a specific embodiment according to the present invention. A grouping is a unique, proprietary categorization of information. FIG. 6 illustrates the administrative framework underlying FIGS. 5A-5B, which provides a basis for administrative groupings, as well as enabling the user to create custom grouping categories in order to gain further insight and customize reports. Administrative frameworks support insights into a client's business process, which in turn provide a consistent means for reporting subscription marketing information, as well.

FIG. 6 illustrates a representative groupings hierarchy 410 having a plurality of information categories. A Corporation 412 is a predefined grouping that denotes a company. Corporate values are stored in a corp_info database table in the facts tables database 105. A Division 414 is a predefined grouping that denotes a division within a company. Division values are stored in the corp_info database table. A Group 416 is a predefined grouping that denotes a subdivision of a division. Group values are stored in the corp_info database table. A Product 418 is a predefined grouping that denotes a specific product sold. Product values are stored in the corp_info database table. A Source Category 420 is a predefined grouping that denotes a category of business within a product (i.e. Agent, Billing, DTP, Gifts, Renewals).

Source Category values are stored in a src_category database table in the facts tables database 105. A Source 422 is a user-defined grouping that denotes a channel of business within a source category grouping 420. A business channel is a group of campaigns. Source values are stored in a source database table in the groupings tables database 107, and propagated to all lower-level database tables.

A Campaign 424 is a user-defined grouping that denotes a particular promotion effort or event. Campaign values are stored in a campaigns database table in groupings tables database 107, and propagated to all lower-level database tables. A Campaign Type 442 is a user-defined grouping that denotes a category of Campaigns. Campaign Type values are stored in the campaigns database table, and propagated to all lower-level database tables.

A Campaign Status 444 is a user-defined grouping that denotes a category of Campaigns. Campaign Type values are stored in the campaigns database table, and propagated to all lower-level database tables. A Panel (campaign subgroup) 426 is a user-defined grouping that denotes a campaign subgroup (a grouping of keys). Panel values are stored in a panels database table in groupings tables database 107, and propagated to all lower-level database tables.

A Panel Type 432 is a user-defined grouping that denotes a category of panels. Panel Type values are stored in the panels database table, and propagated to all lower-level database tables. A Panel Subtype 434 is a user-defined grouping that denotes a category of panels. Panel Subtype values are stored in the panels database table, and propagated to all lower-level database tables. A Package 436 is a user-defined grouping that denotes a category of panels or keys. Package values are stored in the panels database table, and propagated to all lower-level database tables. A Key 428 is an identifier that denotes a grouping of individuals who are sent a common promotion effort. Key values are stored in a keys database table in groupings tables database 107.

A List Category 452 is a user-defined grouping that denotes a broad category or promotional lists. List Category values are stored in the keys database table. A promotional list is a specific source for names used to promote products and services. A List Name 454 is a user-defined grouping that denotes a specific source for names used to promote products and services. List Name values are stored in the keys database table. A List Segment 456 is a user-defined grouping that denotes a specific selection from a list. Selections are often based on demographic or behavioral characteristics (i.e., age, sex, region). List Segment values are stored in the keys database table. FIG. 6 is merely one example of an administrative framework. Many other administrative frameworks that support insights into a client's business process can be readily generated by those of ordinary skill in the art based upon the teachings of the present invention. Such administrative frameworks provide a consistent means for reporting subscription marketing information, as will be discussed in further detail below.

Figure 7:
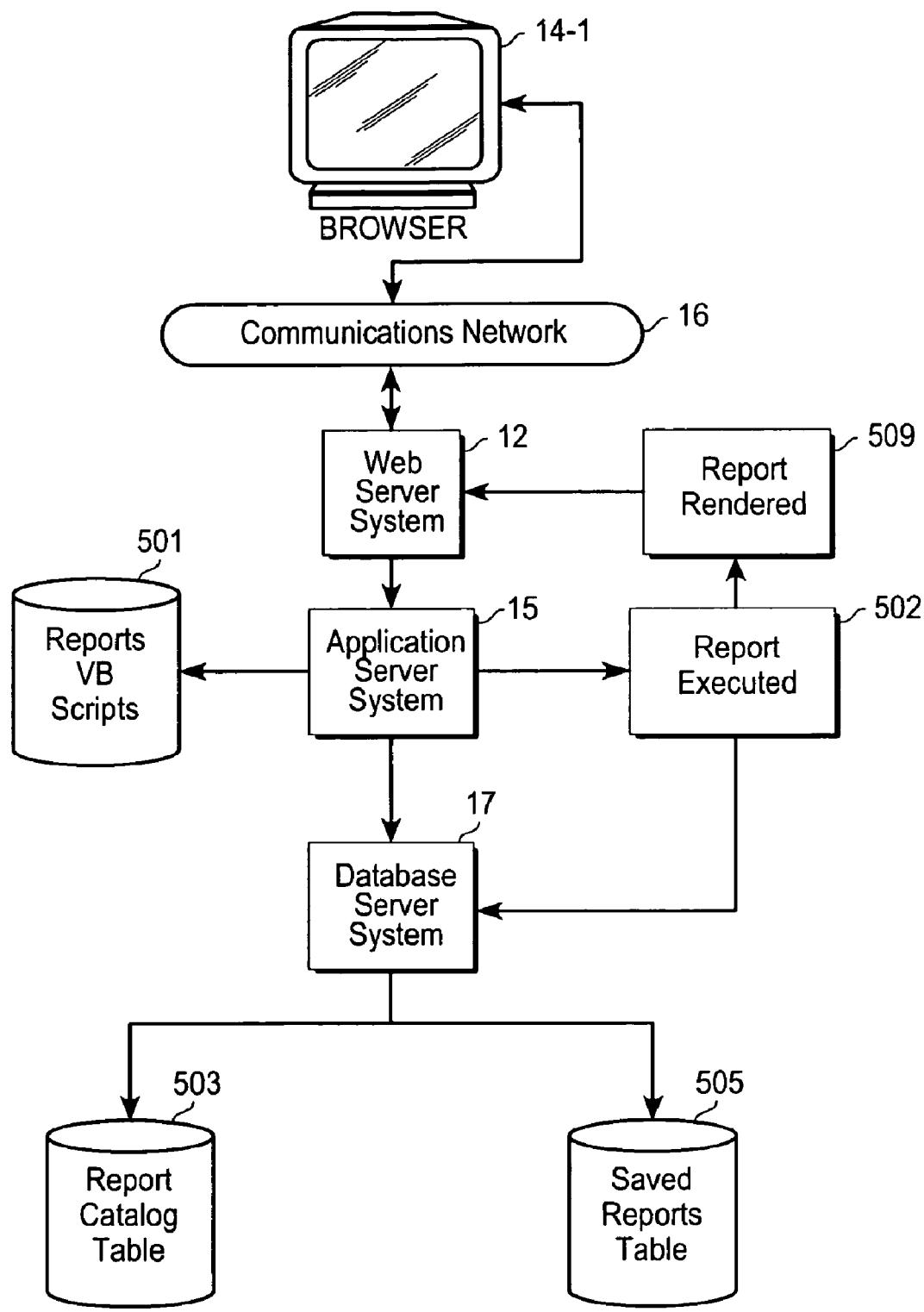
FIG. 7 illustrates a diagram of representative reporting process in a specific embodiment.

FIG. 7 illustrates a diagram of representative reporting process in a specific embodiment. The reporting functions enable users to select reports and query database tables in order produce subscription marketing reports. Reporting functions enable users to selectively choose reports and query database tables in order produce useful subscription marketing reports. In a specific embodiment, the reporting functions are provided through a browser-based interface. Reports provide structured, consistent information that describes the business performance of marketing campaigns. FIG. 7 illustrates a report generating framework, comprising a browser-based interface which can be executed on a client computer, such as client system 14-2, for example. Client 14-2 interacts with web server 12 over network connection 16, which can be any of a number of network topologies, and may include the Internet, for example. Web server system 12 connects with application server system 15, having one or more report processes 501 stored thereon. Report processes 501 can be implemented in a variety of different ways in various specific embodiments. However, in a presently preferable embodiment, report processes 501 are script programs written in the Visual Basic programming language, which provide the basis for interactive web pages displaying the reports.

Application server system 15 connects to a database server system 17 that comprises database management functions, such as locating requested data records, and the like. Database server system 17 manages a report catalog table 503, comprising report file settings such as; report name, report alias, location, and related application settings. Database server system 17 also manages a saved report table 505 that stores information about saved reports. A saved report record includes report selection and location, selection query string, and parameters including user-defined report name, report group and comments. After a specific report file is selected by a user at client 14-2, the selection is communicated through network 16 to web server 12, which passes the selection to application server system 15. The application server system 15 queries the database server 17 to obtain the selected report from report catalog table 503, or from stored report table 505. Then, a valid query string is passed to the report in a report execution process 502. Then, the report is rendered by a report rendering process 504. Reports may be rendered in a variety of ways in various specific embodiments, however, in a presently preferred embodiment, the report is rendered through the browser via an ActiveX control viewer. The viewer presents a picture of grouping and statistical information according to a predefined format. Users control the content of the report by limiting the selection of data.

Figure 8:
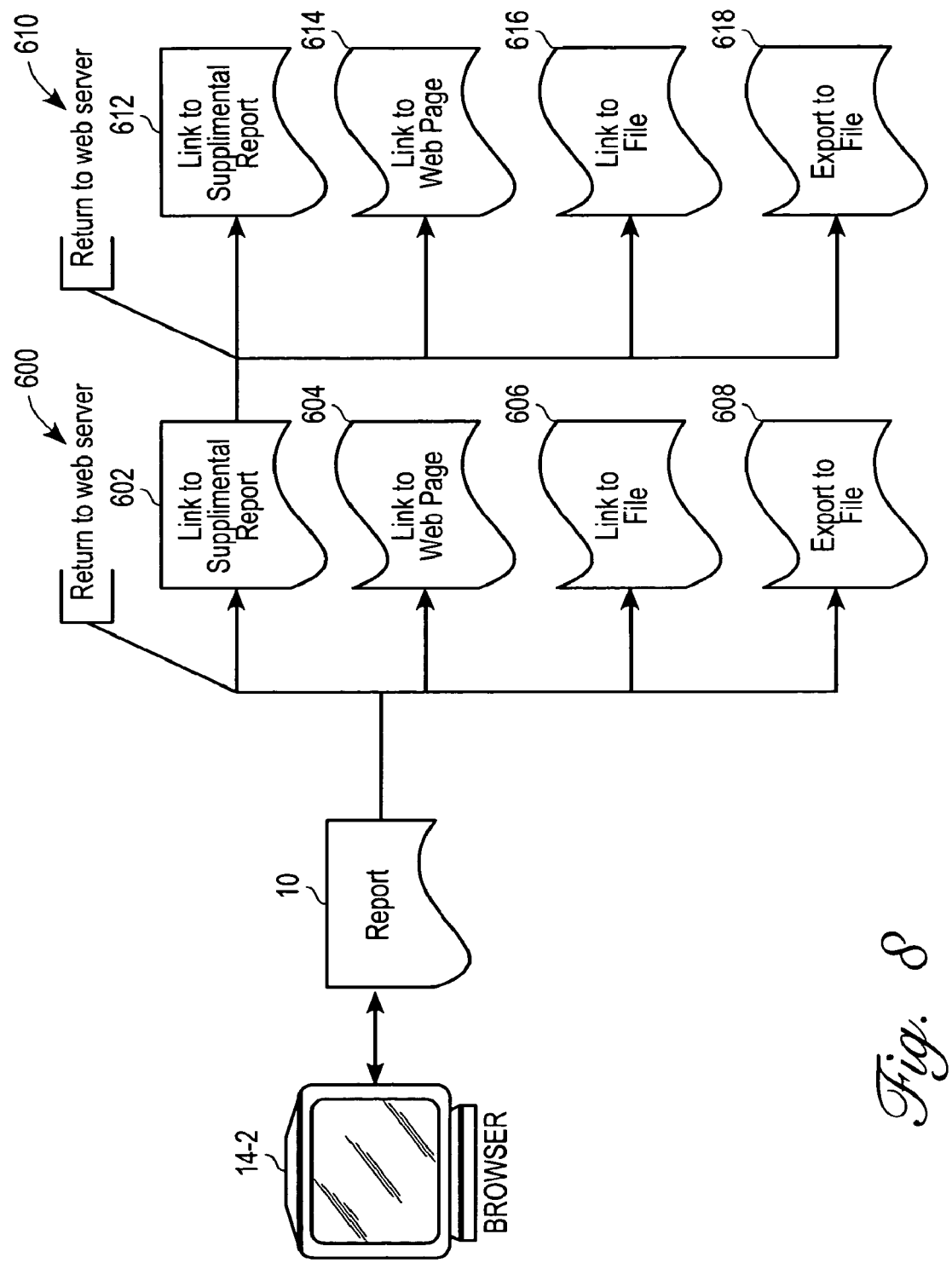
FIG. 8 illustrates a diagram showing a representative hyperlink chain linking reports in a specific embodiment according to the present invention.

FIG. 8 illustrates a diagram showing a representative hyperlink chain linking 25 reports in a specific embodiment according to the present invention. Reports are hyperlinked to other reports, web-pages, or files. The hyperlink chain enables users to launch reports from within a report, or view related files or web-pages, thus reducing the amount of time required to access additional views of information. FIG. 8 illustrates a report 10 comprising a file, for example, that displays grouping and statistical information in a specific format.

Users control the content of report 10 from a browser at client 14-2 by limiting the selection of data that is incorporated into the report. The selection of data is accomplished using a reporting on-line functional application. Report 10 comprises a first plurality of hypertext links 600, including a link to supplemental report 602 that provides a hyperlink to a process that renders a report file that displays grouping and statistical information in a specific format. Data selection criteria is automatically passed to supplemental reports based on the origin of the hyperlink. Hypertext links 600 also includes a link to web page 604 that provides a hyperlink to a process that renders a web page, a link to file 606 that provides a hyperlink to a process that renders or executes a file, a link to an export to file 608 that provides a function that exports the grouping and statistical values presented in the ActiveX report viewer to a file (txt, xls, html). A second plurality of hypertext links 610 is also associated with report 10. Hypertext links 610 comprises links 612-618, which are analogous to links 602-608 of hypertext links 600.

Figure 9:
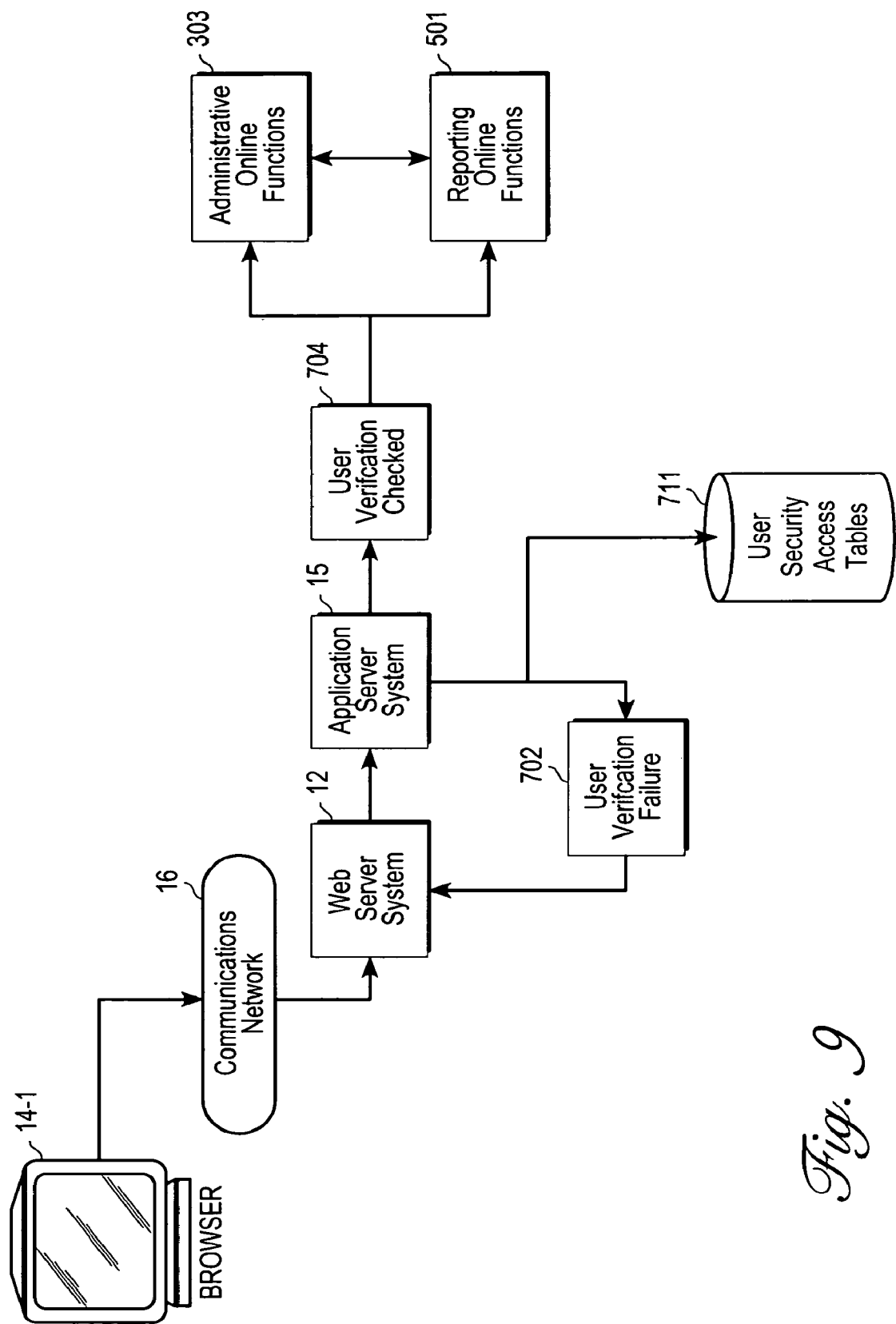
FIG. 9 illustrates a diagram of a representative access security for a database and reporting system in a specific embodiment according to the present invention.

FIG. 9 illustrates a diagram of a representative access security for a database 10 and reporting system in a specific embodiment according to the present invention. Security techniques enable specific embodiments to prevent unauthorized access to client data. In a specific embodiment, secure users are provided with usernames and passwords. Access rights are set by restricting access to specific database tables depending on access security level settings, which are also associated with unique combinations of usernames and passwords. The security functions are provided to users of a browser-based interface which can be executed on a client computer, such as client system 14-1, for example. Client 14-1 interacts with web server 12 over network connection 16, which can be any of a number of network topologies, and may include the Internet, for example. Web server system 12 connects with application server system 15, having one or more administrative processes 303 and reporting processes 501 stored thereon. Application server system 15 has access to a plurality of user security access tables 711, which store user access information, including username, password, database access rights settings and administrative functions rights settings, for example. Application server system 15 comprises stored procedures and security verification procedures, which can be implemented in a variety of different ways, but in a specific embodiment are Visual Basic scripts. A security verification procedure executing in application server system 15 performs a verification of a user's access authority 704. If the user has access rights to the administrative and/or reporting functions, which can be determined by matching a username and a password against user security access tables 711, the user is permitted to access the administrative and/or reporting functions.

However, if a mismatch in username and/or password occurs, then a verification failure process 702 returns the user to a web server logon page in order to provide another opportunity to submit a valid username and password. In a specific embodiment, the above described access control to the administrative and/or reporting functions of the application server 15 may be used in conjunction with access control provided by the web server 12 to provide two layer security functionality. Further, in a specific embodiment, the above described access control to the administrative and/or reporting functions of the application server 15 may be implemented using a plurality of access levels. In a representative specific embodiment, a first security level provides access to basic functions, such as username and password selection and database query functions. A second security level provides access to administrative functions, such as setting permissions for database tables and the like.

Figure 10:
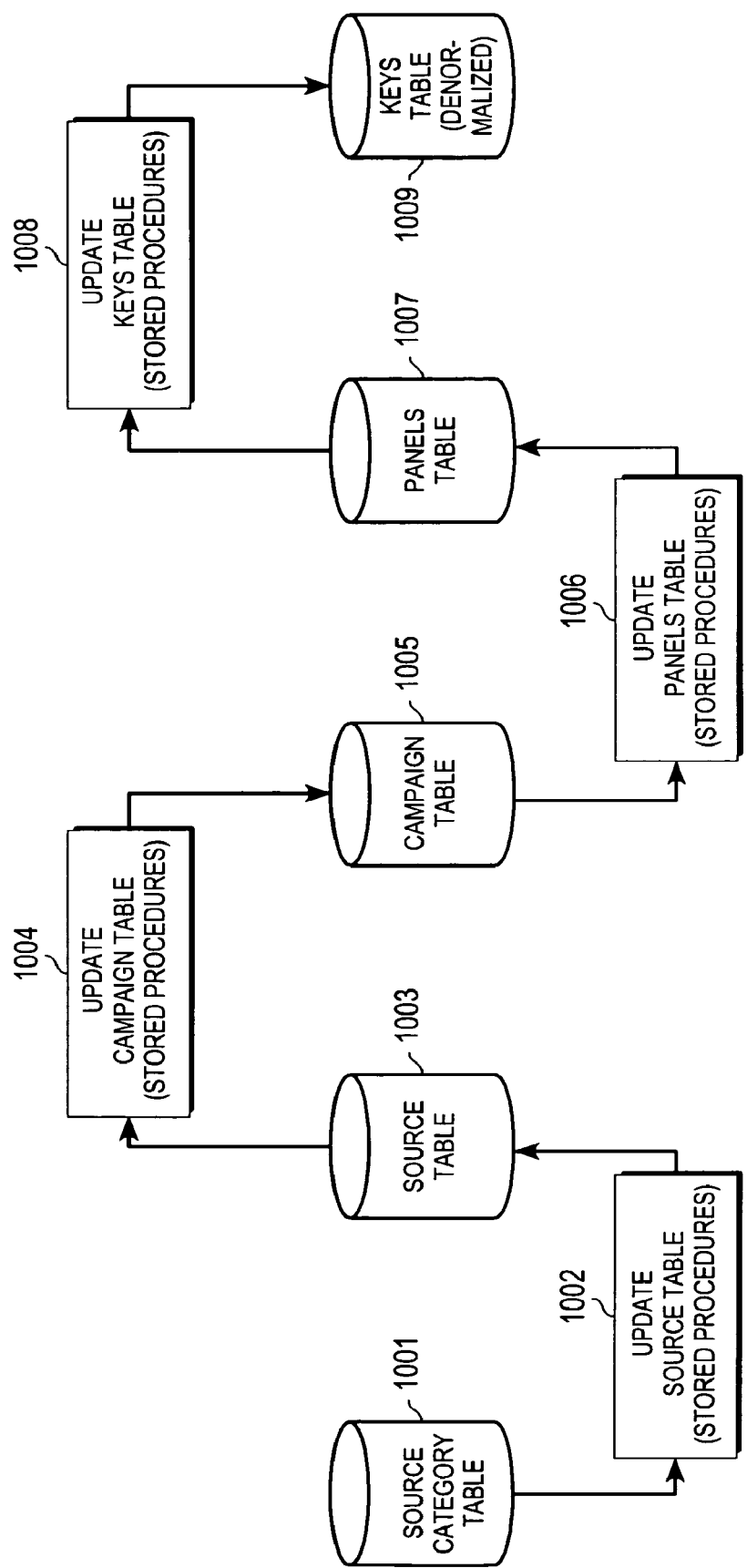
FIG. 10 illustrates a diagram of a representative process for denormalizing database tables in a specific embodiment according to the present invention.

FIG. 10 illustrates a diagram of a representative process for denormalizing database tables in a specific embodiment according to the present invention. In accordance with the invention, database tables are denormalized by propagating information from one table to another, but there is no relationship between the tables by way of a database join operation. In a specific embodiment, this function is provided by specific procedures of the stored procedures 106. The specific stored procedures are activated by users using a browser program at client 14-1, for example, in cooperation with an administrative application. The denormalized database table enables report generation to be performed more quickly by reducing overhead associated with joining a plurality of database tables.

Denormalization takes as input a plurality of tables, from the facts tables 105 and lookup tables 109 and produces a key table 1009, which contains a complete set of grouping information, in groupings tables 107. The groupings (keys) table 107 is the basis for many of the reporting features available in specific embodiments. The groupings table 107 is populated, updated and appended in a variety of ways. For example, a user may apply updates to groupings table 107 using the on-line administrative interface from a browser program on client 14-1. Another technique updates grouping table 107 automatically by referencing a set of user administered lookup tables 109. A yet further technique updates grouping table 107 automatically by referencing a set of lookup tables 109 maintained by a database administrator. The groupings table 107 stores the information used to create a variety of marketing reports corresponding to the administrative framework (groupings hierarchy), without having dependencies on other database tables. Specifically, the key table 1009 in FIG. 10 is used for report generation in a process which matches groupings in the key table 1009.

FIG. 10 illustrates a representative denormalization process, in which a source category table 1001, which is resident in administrative tables 109, provides information to a source table 1003, which is also resident in administrative tables 109, by an update source table process 1002. An update campaign table process 1004 reflects information from source table 1003 to a campaign table 1005. An update panels table process 1006 propagates information from campaign table 1005 to a panels table 1007. An update keys table process 1008 updates keys table 1009, in groupings tables 107 based upon the contents of panels table 1007. In a specific embodiment, update source table process 1002, update campaign table process 1004, update panels table process 1006, and update keys table process 1008 are implemented as stored procedures. By carrying information from one database table to another, these procedures effectively link tables in different databases without requiring a database table join operation.

A representative example of the information exchanged from one database 10 table to another during denormalization processing follows:

Source Category Table to Source Table
product_id
src_cat_name (source category name)
Source Table to Campaign Table
product_id
src cat name (source category name)
source (source name)
Campaign Table to Panel Table
product_id
src_cat_name (source category name)
source (source name)
camp_name (campaign name)
mail_date_fr (mail date)
camp_status (campaign status)
e_set_name (expense set name)
rsetname (revenue set name)
budgeted_vol (budgeted volume)
budgeted_gross_pct (budgeted gross response percent)
Panel Table to Keys Table
product_id
src_cat_name (source category name)
source (source name)
camp_name (campaign name)
mail_date_fr (mail date)
camp_status (campaign status)
e_set_name (expense set name)
rsetname (revenue set name)
budgeted_vol (budgeted volume)
budgeted gross_pct (budgeted gross response percent)
panel_name (panel name)
panel_start_date (panel mail date)
panel_type (panel type)
panel_subtype (panel subtype)
panel_pkg (package description)
Keys Table Inputs and Overrides
All the field values listed above from the Panels Table plus:
key_desc (source key description)
mail_qty_override (mail qty override qty)
newsstand_sale (newsstand sale qty)
newstand_sale_marker (subtotal marker newstand only)
list_cat_name (list category name)
list name (list name)
list_segement_name (list segment name)
list_cost_rollout_cpm (list rollout cost per thousand)
list_cost_basis (basis for calculation list costs)
list_cost_factor (factor applied against list costs)
merge_purge_qty (merge purge qty)
subtotal_flag (subtotal marker)
optional_effort_id (effort sequence marker)

Figure 11:
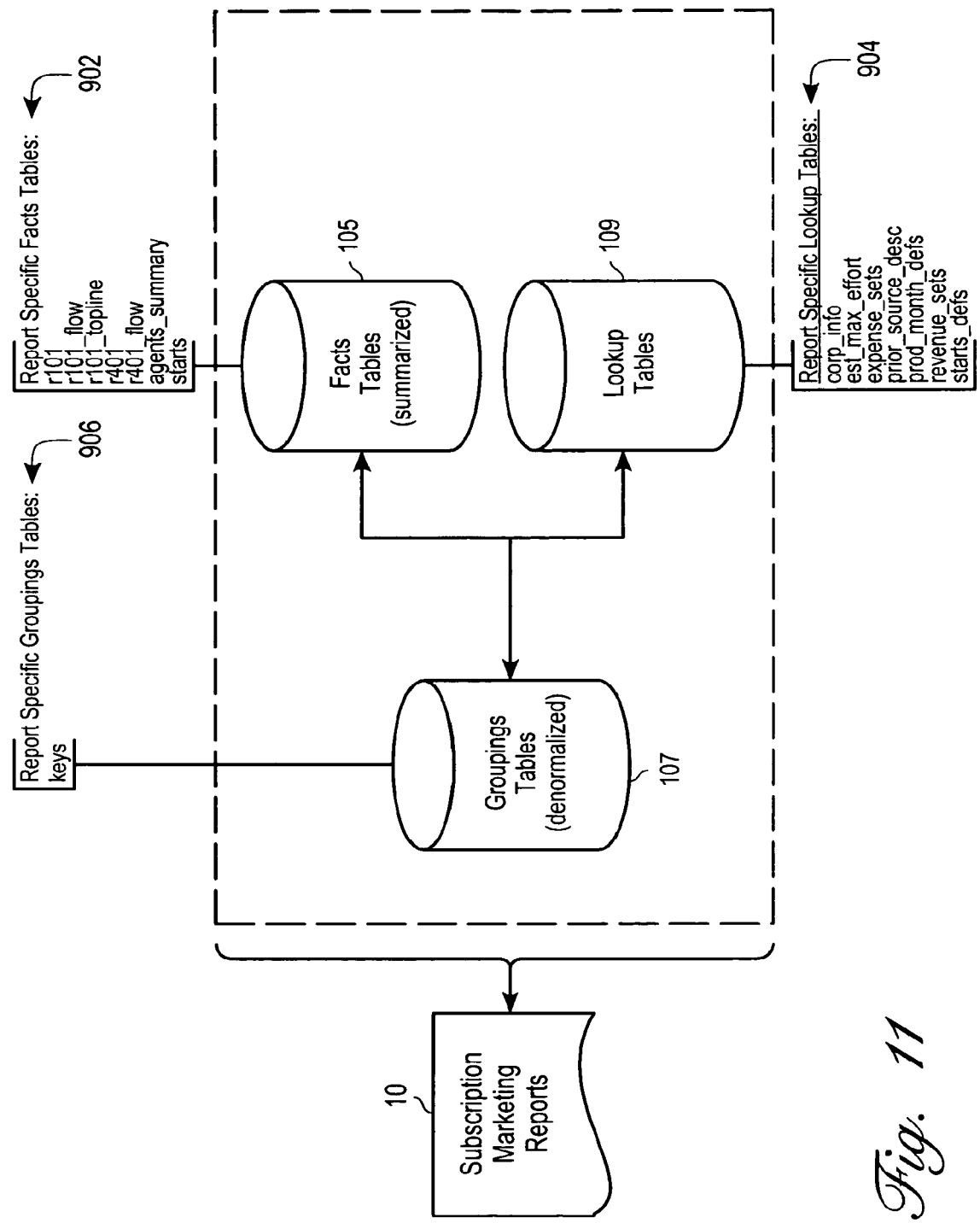
FIG. 11 illustrates a diagram of a representative process for optimizing report generation in a specific embodiment according to the present invention.

FIG. 11 illustrates a diagram of a representative process for optimizing report generation in a specific embodiment according to the present invention. According to the invention, reports may be optimized for performance or other reasons by applying denormalizing processes, such as described above with reference to FIG. 10, to one or more of facts tables 105 and lookup tables 109, for example.

FIG. 11 illustrates a process for optimizing report 10 in accordance with the invention. FIG. 11 illustrates facts tables 105 and lookup tables 109 which provide tables that serve as input to the denormalization processing described with reference to FIG. 10. Facts table 105 comprises one or more report specific fact tables 902. Lookup table 109 comprises one or more report specific lookup tables 904.

Denormalization is applied to report specific fact tables 902 and report specific lookup tables 904 to produce one or more denormalized report specific groupings tables 906 in groupings tables 107. Report 10 is created from the denormalized report specific groupings tables 906 in groupings tables 107. In specific embodiments according to the present invention, this denormalization and report optimizing processing provides improved reporting capabilities by reducing at least one of a number of joins of database tables that must be made and a number of records that must be reported. These reductions enable specific embodiments to provide reports more quickly than conventional techniques. Specific embodiments deliver reports over computer networks, such as the Internet. Further, specific embodiments can produce a report from a relatively large number of transactions within a reasonable delay time.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. For example, the present invention may be used to extract and store information for any domain or industry which benefits from the information extraction and storage. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of analyzing marketing information comprising:
   providing a plurality of marketing subscription information;
   transforming a subset of the plurality of direct marketing subscription information into a plurality of transition tables, structured hierarchically, comprising:
   using a first set of stored procedures, generating a first lookup table for a lookup database, wherein the first lookup table comprises a first level of a hierarchical structure;
   using a second set of stored procedures, generating a second lookup table for a lookup database by propagating at least a portion of information from the first lookup table to the second lookup table, wherein the second lookup table comprises a second level of the hierarchical structure, below the first level; and
   using a third set of stored procedures, generating a key table by denormalizing the first and second lookup tables, wherein the key table comprises the first and second levels of the hierarchical structure; and
   generating a first report by using the key table.

2. The method of claim 1 wherein information in one or more fields is propagated from the first table to the second table.

3. The method of claim 1 further comprising:
   forming a third lookup table by propagating at least a portion of information from the second lookup table to the third lookup table, wherein the lookup database also comprises the third lookup tables, and the generating the key table further comprises denormalizing the third lookup table.

4. The method of claim 1 wherein when generating the first report, at least the first lookup table is not used.

5. The method of claim 1 wherein when generating the first report, at least the second lookup table is not used.

6. The method of claim 1 wherein when generating the first report, the first and second lookup tables are not used.

7. The method of claim 1 further comprising:
   receiving a request to generate a second report after generating the first report; and
   generating the second report by using the key table without referring to the first or second lookup tables.

8. The method of claim 7 wherein the second report comprises at least one hyperlink to the first report.

9. The method of claim 1 further comprising:
   providing a web browser interface through which a plurality of reports may be requested; and
   when receiving a report request through the web browser interface, generating a report by using the key table.

10. The method of claim 9 wherein the key table has not been regenerated between report requests.

11. The method of claim 1 further comprising:
    updating the key table via a browser program executing on a client.

12. The method of claim 1 further comprising:
    revising the first lookup table; and
    regenerating the key table using the revised first lookup table.

13. The method of claim 12 wherein the regenerating the key table is performed without regenerating the second lookup table using the revised first lookup table.

14. The method of claim 1 further comprising:
    saving the first report in a saved reports table; and
    upon receiving a second report request from a client device, generating a second report using the key table, wherein the second report comprises at least one hyperlink to the first report in the saved reports table.

15. The method of claim 1 wherein
    saving the first report in a saved reports table; and
    upon receiving a second report request from a client device, generating a second report using the key table, wherein the second report comprises a plurality of hyperlinks, wherein at least one hyperlink is to the first report and at least one hyperlink will cause generating a third report using the key table.

16. The method of claim 1 wherein the marketing subscription information is not structured hierarchically.

17. The method of claim 1 wherein the generating a first report is in response to a request by a user at a client, coupled through a network to a server where the key table is stored.

18. The method of claim 1 wherein the transition tables are stored in a first database and the first lookup table is stored in a second database, separate from the first database.

19. The method of claim 18 wherein the second lookup table is stored in a second database.

20. The method of claim 1 wherein the third set of stored procedures is executed after the first and second set of stored procedures.

* * * * *